United States Patent [19]

Hess et al.

[11] Patent Number: 4,619,985

[45] Date of Patent: Oct. 28, 1986

[54] PROCESS FOR THE PRODUCTION OF DEACTIVATED SUSPENSIONS OF FINELY-DIVIDED POLYISOCYANATES IN RELATIVELY HIGH MOLECULAR WEIGHT COMPOUNDS, DEACTIVATED SUSPENSIONS AND USE THEREOF FOR THE PRODUCTION OF POLYURETHANES

[75] Inventors: Heinrich Hess; Gerhard Grögler, both of Leverkusen; Richard Kopp, Cologne; James M. Barnes, Wermelskirchen, all of Fed. Rep. of Germany

[73] Assignee: Bayer Aktiengesellschaft, Leverkusen, Fed. Rep. of Germany

[21] Appl. No.: 732,028

[22] Filed: May 8, 1985

[30] Foreign Application Priority Data

May 18, 1984 [DE] Fed. Rep. of Germany ....... 3418430

[51] Int. Cl.$^4$ ............................................. C08G 18/30
[52] U.S. Cl. ..................................... 528/49; 524/724; 524/765; 524/789; 528/48; 528/60; 528/62; 528/64; 528/69; 528/71; 528/73; 528/902
[58] Field of Search ........................ 528/49, 48, 60, 62, 528/64, 69, 71, 73, 902; 524/724, 765, 789

[56] References Cited

U.S. PATENT DOCUMENTS

| | | | |
|---|---|---|---|
| 4,278,578 | 7/1981 | Carpenter | 260/27 |
| 4,400,497 | 8/1983 | Blum et al. | 528/45 |
| 4,483,974 | 11/1984 | Grogler et al. | 528/68 |
| 4,507,413 | 3/1985 | Thoma | 524/42 |
| 4,525,570 | 6/1985 | Blum et al. | 528/75 |

FOREIGN PATENT DOCUMENTS 3228723 2/1984 Fed. Rep. of Germany .
3228724 2/1984 Fed. Rep. of Germany .
3228670 2/1984 Fed. Rep. of Germany .

*Primary Examiner*—Maurice J. Welsh
*Attorney, Agent, or Firm*—Gene Harsh; Joseph C. Gil

[57] ABSTRACT

The present invention is directed to a process for the production of suspensions of finely-divided polyisocyanates which are obtainable by the surface reaction with from 0.1 to 25 equivalent percent of reactive group per NCO of stabilizers in relatively high molecular weight polyols and/or relatively high molecular weight polyamines having molecular weights from 400 to 6,000 optionally with addition of lower molecular weight polyols and/or aromatic amines having molecular weights of from 60 to 399, which are characterized in that unreacted quantities of stabilizers in the suspension are subsequently partially or completely deactivated by addition of substances having an acylating and/or neutralizing and/or alkylating effect and/or adsorbing effect as "deactivators". In particular, mono- and/or polyisocyanates are used as "deactivators". Deactivated suspensions obtainable in this way do not exhibit rising thickening temperatures during the production of polyurethanes, in particular in large-volume shaped articles.

The present invention also relates to deactivated suspensions obtainable by the present process and to the use thereof for polyurethane production.

12 Claims, No Drawings

PROCESS FOR THE PRODUCTION OF DEACTIVATED SUSPENSIONS OF FINELY-DIVIDED POLYISOCYANATES IN RELATIVELY HIGH MOLECULAR WEIGHT COMPOUNDS, DEACTIVATED SUSPENSIONS AND USE THEREOF FOR THE PRODUCTION OF POLYURETHANES

BACKGROUND OF THE INVENTION

The production of heat-hardenable mixtures of substances, which are stable in storage at room temperature, from a solid finely-divided polyisocyanate, which is deactivated by partial chemical reaction on the particle surface, (preferably with aliphatic polyamines) to form a polyurea protective covering, and is suspended in at least one compound capable of reacting with isocyanate groups, for example relatively high molecular weight polyols and/or polyamines, is known. U.S. Pat. No. 4,483,974 describes the production of solid polyisocyanates having retarded reactivity which are stabilized by covering them with polyaddition products and which are formed by reactions with "amine stabilizers" (polyamines, hydrazine(s) or hydrazide compounds having terminal —CO-NH-NH$_2$ groups). The covering is formed substantially from polyaddition products in a thin layer and in a secondary reaction of the NCO groups (from 0.1 to 25%) on the surface of the solid isocyanate particles with the amine stabilizers. The stabilization reaction produces polyisocyanate particles which react as polyisocyanates in a one-component polyurethane reactive system, i.e., as a suspension in relatively high molecular weight polyols and/or relatively high molecular weight polyamines, optionally with addition of lower molecular weight polyols or (aromatic) polyamines. The components react only above the thickening temperature, for example by heating, by destroying the covering by shearing forces, or by simply dissolving the polyadduct layer using polar solvents.

The "polyadduct" covering on the solid polyisocyanate particles varies somewhat according to the type of "amine stabilizers". Polyurea coverings are formed with polyamines, polyhydrazodicarbonamide coverings with hydrazines, and even more complex polyadducts having a plurality of variously arranged —NH— and —CO— groups in the polymer chain are formed with hydrazide compounds having terminal CO-NH-NH$_2$ groups (such as dihydrazides, bis-semicarbazides, bis-carbazine esters, semicarbazidehydrazides or aminohydrazides).

According to our patent application No. P 34 01 753 (corresponding to U.S. application Ser. No. 691,593, filed Jan. 15, 1985 now U.S. Pat. No. 4,574,147), it is also possible with guanidines or amidines not containing isocyanate-reactive hydrogen atoms to produce polyadduct coverings on the isocyanates which also cause retarding of the NCO reactivity. Other processes for the production of polyisocyanates having retarded reactivity are described in German Offenlegungsschriften Nos. 3,228,723, 3,228,724 and 3,228,670, and U.S. Pat. No. 4,400,497.

The stabilized polyisocyanates are preferably produced directly in suspension in polyols and/or polyamines (preferably in relatively high molecular weight polyols) optionally with addition of lower molecular weight polyols or aromatic polyamines as chain-extenders, or in relatively high molecular weight polyamines with aromatic polyamines, optionally with addition of lower molecular weight aromatic polyamines and/or lower molecular weight polyols as chain-extenders and exist in the form of useable suspensions for one-component polyurethanes.

The stabilized polyisocyanates have good storage stability in the suspending high molecular weight polyols and/or also relatively high molecular weight polyamines, even in the presence of highly effective polyurethane catalysts, and even at elevated temperatures, providing the temperatures remain below the thickening temperature. When using the stabilized polyisocyanates, reactive mixtures containing aromatic diamines as chain-extenders are eminently stable in storage and exhibit a markedly lengthened pot-life in casting systems, even in the case of using liquid aromatic polyamines.

The curing of one-component reactive mixtures may also be effected by mere heating, a rapid polyaddition reaction taking place above a certain temperature ("thickening temperature" or "thickening point"). This "thickening temperature" may be varied and a high stability in storage may be adjusted merely by varying the reaction conditions (for example, temperature during the covering reaction), choice of the reaction medium or type and quantity of stabilizer used for stabilization.

The one-component reactive system may be caused to react in a relatively low temperature range (above the thickening temperature, preferably $\geq 55°$ C., more preferably from 100° to 135° C.) by heat hardening. It is possible to produce high quality polyurethane plastics depending on the choice of reactants.

It has been found that difficulties arise, in particular, during the production of bulky shaped articles, for example in the case of roller coatings or cylindrical shaped articles of relatively large diameter. These difficulties lead to inhomogeneous shaped articles having poor mechanical properties. Solidification of these one-component polyurethane systems above the "thickening temperature" proceeds relatively slowly as the heat from the heated molding wall is transmitted to the interior relatively slowly through the polyurethane layer being formed.

In the case of bulky shaped articles, it has surprisingly been found that a liquid core which does not solidify remains even after prolonged heating, even above the "thickening temperature". If the temperature is raised considerably above the thickening temperature, a complete thorough reaction may be possible, but shaped articles of uneven composition are generally obtained as solid, deactivated polyisocyanate has settled in the liquid core. This leads to inhomogeneous polymer zones which are highly cross-linked in some regions (brittle, hard) and under-cross-linked in other regions (soft to tacky). The large-volume shaped articles are thus unusable. In some cases bulges of liquid material are formed or streaks of differing composition are produced.

DESCRIPTION OF THE INVENTION

The heat-hardenable mixtures of the present invention of the type described above, are stable in storage and are in the form of solid polyisocyanates stabilized with stabilizers and at least one relatively high molecular weight NCO-reactive component. They exhibit fast and uniform solidification when heat is supplied and exhibit no rise in the thickening point. At the same time, they do not have the known, abovementioned disadvantages during the solidification of large-volume shaped articles.

The present invention is directed to a process for the production of deactivated suspensions of solid polyisocyanates of retarded reactivity comprising:

(A) reacting
  (i) one or more solid, finely divided polyisocyanates having melting points above 30° C. with
  (ii) from 0.1 to 25 equivalent percent of reactive groups per isocyanate equivalent of a stabilizer compound having a molecular weight of from 32 to 6000 selected from the group consisting of aliphatic polyamines, hydrazines, alkyl-hydrazines, N,N'-dialkylhydrazines, polyhydrazides, amidine-group containing compounds, guanidine-group containing compounds, and mixtures thereof, in the presence of
  (iii) an organic material having a molecular weight of from 400 to 6000 selected from the group consisting of
    (1) compounds containing two or more hydroxyl groups,
    (2) compounds containing two or more aromatically-bound amino groups, and
    (3) mixtures thereof,
to thereby form a suspension of stabilized polyisocyanate in said organic material, and
(B) adding to the suspension of step (A) at a temperature below the melting temperature of the polyisocyanate, a deactivator which at least partially deactivates any unreacted quantities of said stabilizer compound. The deactivator is preferably selected from the group consisting of
  (i) compounds having an acylating effect on said stabilizer compound,
  (ii) compounds having a neutralizing effect on said stabilizer compound,
  (iii) compounds having an alkylating effect on said stabilizer compound, and
  (iv) solid adsorbents which adsorb said stabilizer compound.

The process for reacting the finely-divided polyisocyanates with the stabilizers is carried out directly in the relatively high molecular weight polyols and/or relatively high molecular weight aromatic polyamines having molecular weights from 400 to 6000 optionally with addition of lower molecular weight polyols and/or aromatic polyamines as chain-extenders having molecular weights of from 60 to 399, to form suspensions, preferably in quantities corresponding to a formulation of a one-component polyurethane system. The deactivators for the remaining unreacted stabilizers are then added before the one-component reactive systems are finally reacted.

The present invention also relates to deactivated suspensions produced by the process of the invention.

Deactivated suspensions of polyadduct-covered stabilized polyisocyanates which may be obtained using aliphatic diamines and/or polyamines and/or hydrazine as stabilizers in relatively high molecular weight aromatic polyamines, optionally with addition of lower molecular weight aromatic diamines are particularly preferred. Suspensions in which the still-unreacted stabilizers are partially or completely reacted with di- and/or polyisocyanates or NCO-prepolymers, and in particular aliphatic di- and/or poly-isocyanates as deactivators, are also particularly preferred.

The present invention also relates to a process of producing isocyanate addition products by the reaction of
(A) polyisocyanates,
(B) relatively high molecular weight polyhydroxyl and/or polyamino compounds,
(C) optionally, low molecular weight chain-extenders,
(D) optionally, catalysts and
(E) optionally, conventional auxiliaries and additives,
the improvement wherein components (A) and (B) are supplied in the form of a suspension produced in accordance with the present invention.

Preferred for the production of polyurethane are deactivated suspensions of polyamine stabilized polyisocyanates in relatively high molecular weight aromatic polyamines, optionally with addition of lower molecular weight aromatic diamines, and aliphatic diisocyanates and/or polyisocyanates being used as "deactivators". Systems in which sufficient quantities of polyisocyanates (A) and higher molecular weight and optionally lower molecular weight compounds (B) or (C) are used to produce one-component systems which react directly to form high molecular weight polyurethanes (ureas) are also preferred. With amine systems, no catalysts are required for thorough hardening to polyurethane (urea) and the temperatures or the curing times are lower than with polyol systems. Very desirable elastomeric properties are also obtained. The deactivated suspensions according to the present invention are also preferably used in such a way that the polyisocyanates of retarded reactivity can be used as the sole polyisocyanates for the production of polyurethanes. It is also possible to use combinations of the stabilized polyisocyanates according to the present invention and unstabilized polyisocyanates, for example toluylene diisocyanates, diphenylmethane diisocyantes, naphthylene 1,5-diisocyanate or dimeric toluylene diisocyanate or 3,3'-diisocyanato-4,4'-dimethyl-N,N'-diphenylurea. With these combinations, however, it is preferred to use at least 50 equivalent percent of all isocyanate groups as stabilized polyisocyanates. All polyisocyanates listed in German Offenlegungsschrift No. 2,920,501 (pages 12 to 16) are suitable as unstabilized polyisocyanates.

If suspensions of the stabilized polyisocyanates in the relatively high molecular weight compounds (B) are used, the quantities of (B) may preferably be selected in such a way that the composition corresponds to the desired polyurethane-forming component mixture ("one-component reactive mixture"). However, with a differing composition for polyurethane formation, the same or different higher molecular weight components (B) may be used for polyurethane production.

Similarly, the polyol or aromatic polyamine chain-extenders (C) from the stabilization reaction may optionally also be present in quantities suitable for one-component systems. Otherwise (C) may be added as further chain-extender component(s).

Other embodiments are described in U.S. Pat. No. 4,483,974 (the disclosure of which is herein incorporated by reference), which may easily be applied to the suspension according to the present invention.

Any di- or polyisocyanates or mixtures thereof are suitable starting components for the solid polyisocyanates stabilized according to the invention, provided they have a melting point above 30° C., preferably above 80° C., most preferably above 130° C.

These isocyantes may be aliphatic, cycloaliphatic or araliphatic polyisocyanates but are preferably aromatic or heterocyclic polyisocyanates. Other suitable polyisocyanates include the polyphenyl-polymethylene polyisocyanates obtained by aniline-formaldehyde condensation followed by phosgenation as described in British Pat. Nos. 874,430 and 848,671; perchlorinated aryl polyisocyanates; polyisocyanates containing carbodiimide groups; polyisocyanates containing allophanate groups; polyisocyanates containing isocyanurate groups; polyisocyanates containing urethane or urea groups; polyisocyanates containing acylated urea groups; polyisocyanates containing biuret groups; polyisocyanates prepared by telomerization reactions; and polyisocyanates containing ester groups. Diisocyanates containing uretdione groups and diisocyanates containing urea groups are also preferred. The following are mentioned as examples of suitable polyisocyanates:

| | MP.: |
|---|---|
| p-xylylene diisocyanate | 45–46° C. |
| 1,5-diisocyanatomethyl naphthalene | 88–89° C. |
| 1,3-phenylene diisocyanate | 51° C. |
| 1,4-phenylene diisocyanate | 94–96° C. |
| α,α,α',α'-tetramethyl-p-xylylene diisocyanate | 72° C. |
| 1-methylbenzene-2,5-diisocyanate | 39° C. |
| 1,3-dimethylbenzene-4,6-diisocyanate | 70–71° C. |
| 1,4-dimethylbenzene-2,5-diisocyanate | 76° C. |
| 1-nitrobenzene-2,5-diisocyanate | 59–61° C. |
| 1,4-dichlorobenzene-2,5-diisocyanate | 134–137° C. |
| 1-methoxybenzene-2,4-diisocyanate | 75° C. |
| 1-methoxybenzene-2,5-diisocyanate | 89° C. |
| 1,3-dimethoxybenzene-4,6-diisocyanate | 125° C. |
| azobenzene-4,4'-diisocyanate | 158–161° C. |
| diphenylether-4,4'-diisocyanate | 66–68° C. |
| diphenylmethane-4,4'-diisocyanate | 42° C. |
| diphenyl-dimethylmethane-4,4'-diisocyanate | 92° C. |
| naphthalene-1,5-diisocyanate | 130–132° C. |
| 3,3'-dimethylbiphenyl-4,4'-diisocyanate | 68–69° C. |
| diphenyldisulphide-4,4'-diisocyanate | 58–60° C. |
| diphenylsulphone-4,4'-diisocyanate | 154° C. |
| 1-methylbenzene-2,4,6-triisocyanate | 75° C. |
| 1,3,5-trimethylbenzene-2,4,6-triisocyanate | 93° C. |
| triphenylmethane-4,4',4''-triisocyanate | 89–90° C. |
| 4,4'-diisocyanato-(1,2)-diphenyl-ethane | 88–90° C. |
| dimeric 1-methyl-2,4-phenylene diisocyanate | 156° C. |
| dimeric 1-isopropyl-2,4-phenylene diisocyanate | 125° C. |
| dimeric 1-chloro-2,4-phenylene diisocyanate | 177° C. |
| dimeric 2,4'-diisocyanato-diphenylsulphide | 178–180° C. |
| dimeric diphenylmethane-4,4'-diisocyanate | |
| 3,3'-diisocyanato-4,4'-dimethyl-N,N—diphenylurea | |
| 3,3'-diisocyanato-2,2'-dimethyl-N,N—diphenylurea | |
| N,N'—bis[4(4-isocyanatophenylmethyl)phenyl] urea | |
| N,N'—bis[4(2-isocyanatophenylmethyl)phenyl] urea | |

According to the present invention, dimeric 1-methyl-2,4-diisocyanatobenzene, dimeric 4,4'-diisocyanatodiphenylmethane, 3,3'-dimethyl-4,4'-diisocyanatodiphenyl, 3,3'-diisocyanato-4,4'-dimethyl-N,N'-diphenylurea, N,N'-bis[4-(4-isocyanatophenylmethyl)-phenyl] urea, 1,5-naphthalene-diisocyanate and 1,4-phenylenediisocyanate are particularly preferred.

The following classes of compounds may be used for stabilization of the above-mentioned polyisocyanates:
1. aliphatic or cycloaliphatic di- and polyamines,
2. hydrazine, alkylhydrazines, N,N'-dialkylhydrazines and di- and polyhydrazide compounds, and
3. acyclic, monocyclic or bicyclic amidines and guanidines having the structure mentioned.

The amine stabilizers used may be difunctional or higher functional low molecular weight or relatively high molecular weight compounds containing aliphatically bound primary and/or secondary amino groups and having molecular weights of from 60 to about 6000, preferably from 60 to 3000. These compounds are low molecular weight and/or relatively high molecular weight primary and/or secondary polyamines, and are preferably diamines. The amino groups in these amines are attached to aliphatic groups (including cycloaliphatic groups) or to the aliphatic moiety of araliphatic groups. The aliphatic or cycloaliphatic di- and polyamines may contain OH groups, tertiary amino groups, ether groups, thioether groups, urethane groups, urea groups, carboxyl groups or carboxylic acid alkyl ester groups, sulphonate groups, carboxylate groups or sulphonic acid ester groups in addition to the amino groups.

Suitable di- and polyamines for use as stabilizers include, for example. ethylene diamine; 1,2- and 1,3-propanediamine; 1,4-butanediamine; 1,6-hexanediamine; neopentanediamine; 2,2,4- and 2,4,4-trimethyl-1,6-diamino-hexane; 2,5-dimethyl-2,5-diamino-hexane, 1,10-decanediamine; 1,11-undecanediamine; 1,12-dodecanediamine; bis-aminomethyl-hexahydro-4,7-methanoindane (TCD-diamine); 1,3-cyclohexanediamine; 1,4-cyclohexanediamine; 1-amino-3,3,5-trimethyl-5-aminomethyl-cyclohexane (isophoronediamine); 2,4- and/or 2,6-hexahydrotolylenediamine; 2,4'- and/or 4,4'-diaminodicyclohexylmethane; m- or p-xylylenediamine; bis-(3-amino-propyl)-methylamine; bis-N,N'-(3-amino-propyl)-piperazine; 1-amino-2-aminomethyl-3,3,5-(3,5,5)-trimethylcyclopentane; 2,2-dialkylpentane-1,5-diamines; 1,5,11-triaminoundecane; 4-aminomethyl-1,8-diamino-octane; lysine methyl ester; cycloaliphatic triamines according to German Offenlegungsschrift No. 2,614,244; 4,7-dioxadecane-1,10-diamine; 2,4- and 2,6-diamino-3,5-diethyl-1-methylcyclohexane and mixtures thereof; alkylated diaminodicyclohexylmethanes, (e.g. 3,3'-dimethyl-5,5'-diamino-dicyclohexylmethane or 3,5-diisopropyl-3',5'-diethyl-4,4'-diaminodicyclohexylmethane); perhydrogenated diaminonaphthalenes; perhydrogenated diaminoanthracenes; as well as higher valent amines such as diethylenetriamine, triethylenetetramine, pentaethylenehexamine, dipropylenetriamine, tripropylene tetramine or N,N'-dimethyl-ethylenediamine; 2,5-dimethylpiperazine; 2-methylpiperazine; piperazine (hydrate); 2-hydroxyethylpiperazine; 2-(2-aminoethyl)-aminoethyl sulphonic acid sodium, and the like.

In addition to these low molecular weight aliphatic diamines or in admixture with them there may also be used relatively high molecular weight aliphatic di- and polyamines such as those obtained, for example, by reductive amination of polyoxyalkylene glycols with ammonia as described in Belgian Pat. No. 634,741 or U.S. Pat. No. 3,654,370. Other relatively high molecular weight polyoxyalkylene polyamines may be prepared by methods such as those listed in the in-house publication "Jeffamine, Polyoxypropylene Amines" by Texaco Chemical Co., 1978; by the hydrogenation of cyanoethylated polyoxypropylene glycols (German Offenlegungsschrift No. 1,193,671); or by the reaction of isocyanate prepolymers with hydroxyl-containing enamines, aldimines or ketimines, followed by hydrolysis, as described in German Auslegeschrift No. 2,546,536. Suitable relatively high molecular weight aliphatic di- and polyamines also include the polyamines obtainable according to German Offenlegungsschriften Nos. 2,948,419 and 3,039,600 by alkaline hydrolysis of isocyanate prepolymers (obtained from aliphatic diisocyanates). These relatively high molecular weight polyamines have molecular weights of from about 400 to 6000, and preferably from 400 to 3000, and most preferably from 1000 to 3000. Due to their structure, such relatively high molecular weight polyamines are particularly suitable for the formation of a non-friable, "elastic" polyurea envelope. They are therefore used for amine stabilization of the polyisocyanate particles, preferably in admixture with low molecular weight di- and polyamino compounds.

The stabilizers used for the above mentioned polyisocyanates may also be hydrazine, alkylhydrazines or N,N'-dialkylhydrazines [preferably having $C_1$-$C_6$-alkyl groups and optionally also containing chlorine or OH groups as further substituents (molecular weights preferably from 32 to 198)] and/or difunctional or higher functional low molecular weight or relatively high molecular weight compounds carrying —CO-NH-NH$_2$ end groups and having molecular weights of from 90 to about 6000, preferably from 90 to 3000. Examples of such compounds include hydrazine (usually in the form of hydrazine hydrate); and alkyl substituted hydrazines (e.g. methylhydrazine, ethyl-hydrazine, hydroxyethylhydrazine or N,N'-dimethylhydrazine). Compounds carrying hydrazide end groups are also suitable stabilizers and include e.g. di- and polyhydrazides such as carbodihydrazide, hydracrylic acid hydrazide, oxalic acid dihydrazide, adipic acid dihydrazide, terephthalic acid dihydrazide, isophthalic acid hydrazide or compounds containing hydrazide and semicarbazide, carbazine ester or amino groups, e.g. β-semicarbazidopropionic acid hydrazide. 2-semicarbazido-ethylene carbazine ester, amino-acetic acid hydrazide, β-aminopropionic acid hydrazide or bis-carbazine esters such as ethylene-biscarbazine ester or bis-semicarbazides such as ethylene-bis-semicarbazide or isophorone-bis-semicarbazide. Hydrazine and low molecular weight compounds carrying CO-NH-NH$_2$ groups and having molecular weights of from 32 to 399 are preferred. Hydrazine hydrate and β-semicarbazido-propionic acid hydrazide and alkylene-bissemicarbazides are particularly preferred.

Particularly suitable stabilizers are acyclic, monocyclic or bicyclic compounds which contain the amidine and/or guanidine group

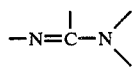

(I)

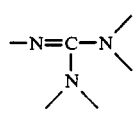

(II)

once or several times and are free from any hydrogen atoms capable of reacting with isocyanates at room temperature.

The acyclic, monocyclic and bicyclic amidine and guanidine compounds will be briefly referred to in this application as "amidine/guanidine compounds" or "compounds having amidine/guanidine groups" or quite simply as "amidine/guanidine stabilizers".

The amidines to be used include acyclic or cyclic amidines, preferably those corresponding to formula (III) to (VII):

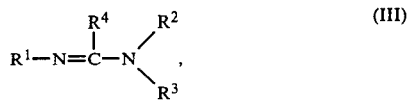

wherein

R$^1$ and R$^4$, may be the same or different and represent H, a straight chain or branched aliphatic hydrocarbon group with 1 to 18 carbon atoms, (preferably 1 to 4 carbon atoms), a cycloaliphatic hydrocarbon group with 5 to 7 ring carbon atoms, an araliphatic group or an aromatic group, any of which groups may have inert substituents and/or may be interrupted by the structural units —O—, —S—, or —N-alkyl or —N-cycloalkyl, and R$^2$ and R$^3$ may be the same or different and can be the same as R$^1$ or can be a group such as alkylene-N-(dialkyl) groups or alkylene-N-(dicycloalkyl) groups, preferably —(CH$_2$)$_n$—N-(C$_1$ to C$_6$-alkyl)$_2$ group but cannot be H.

The amidines are most preferably mono- or bicyclic amidines in which any two of the groups R$^1$ to R$^4$ may be joined together to form a ring. Several amidine groups may be joined together through multivalent groups.

Such cyclic amidines preferably correspond to formulae (IV) to (VII). In amidines corresponding to formula (IV)

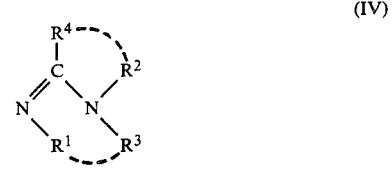

the groups R$^1$ and R$^3$ together and/or the groups R$^2$ and R$^4$ together represent an optionally branched alkylene group having 2 to 5 carbon atoms in the alkylene chain, preferably the —(CH$_2$)$_2$- or —(CH$_2$)$_3$- group, optionally containing hetero atoms or groups such as —O—, —S— or —N-alkyl groups. In amidines corresponding to the formula (V)

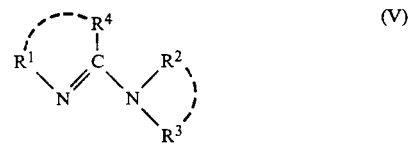

the groups R$^1$ and R$^4$ together and/or the groups R$^2$ and R$^3$ together represent an optionally branched alkylene group having 2 to 5 carbon atoms in the alkylene chain, preferably the —(CH$_2$)$_2$- or —(CH$_2$)$_3$- group, optionally containing hetero atoms. The cyclic amidines may also correspond to formula (VI) containing several amidine groups:

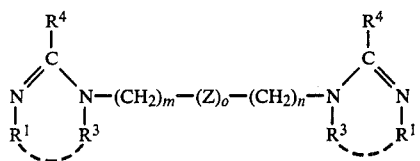

in which
Z represents an N-alkyl group, a straight chained or branched $C_2$ to $C_{14}$-alkylene group optionally interrupted by —O— in the chain, a cycloalkane group having 5 to 8 ring members or a dicyclohexyl-($C_1$-$C_4$-alkane) group and m and n may be identical or different integers from 2 to 10, preferably 2 or 3, and O denotes zero or 1. Particularly preferred amidines include those corresponding to formula (VII)

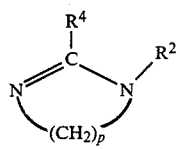

wherein
p=2, 3 or 4,
$R^4$=straight chained or branched $C_1$-$C_4$-alkyl (e.g. methyl, ethyl, isopropyl or tert.-butyl),
$R^2$=straight chained or branched $C_1$-$C_4$-alkyl, —$(CH_2)_p.N.(R^4)_2$ or $C_5$-$C_7$-cycloalkyl.

The following are examples of acyclic amidines (III): N,N-dimethylformamidine, N,N-dimethylacetamidine, N,N-diethyl-formamidine, N,N-dimethyl-N'-benzyl-N'-acetamidine, N,N-dicyclohexyl-N'-methylacetamidine, N,N-dimethyl-N'-cyclohexylformamidine, N,N-dimethyl-N'-tert.-butyl-formamidine, and N,N,N'-trimethyl-acetamidine.

The following are examples of particularly preferred monocyclic amidines (IV): 1,2-dimethyl-Δ2-imidazoline, 1-methyl-2-phenyl-Δ-2-imidazoline, 1(N)-methyl-Δ-2-imidazoline, 2-benzylamino-N-methylcaprolactam, 2-butylimino-N-methyl-butyrolactam, 1,8-diaza-bicyclo[5,3,0]-dec-7-ene, 1,8-diazabicyclo[5,4,0]-undec-7-ene, 1,7-diaza-bicyclo[4,4,0]dec-6-ene, 1,6-diaza-bicyclo[3,4,0]-non-5-ene, 1,5-diaza-bicyclo[4,3,0]-non-5-ene, 1,14-diaza-bicyclo[11,4,0]-heptadec-13-ene, 1-(N)-methyl-Δ-2-tetrahydropyrimidine, 1-cyclohexyl-2-methyl-Δ-2-tetrahydropyrimidine, 1-cyclohexyl-Δ-tetrahydropyrimidine, 1-benzyl-2-butyl-Δ-2-tetrahydropyrimidine, 1-methyl-2-methyl-Δ-2-tetrahydropyrimidine, 1-butyl-2-methyl-Δ-2-tetrahydropyrimidine, 1-(2-ethylhexyl)-2-methyl-Δ-2-tetrahydropyrimidine, 1-dodecyl-2-methyl-Δ-2-tetrahydropyrimidine, 1-(1-methylcyclohexyl)-2-methyl-Δ-2-tetrahydropyrimidine, 1-(2-methylhexyl)-2-methyl-Δ-2-tetrahydropyrimidine, 1-(3,3,5-trimethylcyclohexyl)-2-methyl-Δ-2-tetrahydropyrimidine.

Compounds of this type may be synthesized in particular in accordance with the instructions given in German Auslegeschrift No. 2,439,550.

Particularly preferred amidines are those of type IVa):

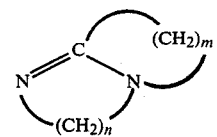

wherein
m represent 2, 3, 4, 5 or 11 and
n represnets 2, 3, or 4.

The preparation of a number of such compounds has been described, for example, in German Pat. No. 1,545,855.

The following are examples of compounds of type IV containing a dialkylaminoalkyl side group, $R^2$: 1-(3-N,N-dimethylamino-propyl)-2-methyl-Δ-2-tetrahydropyrimidine, and 1-(2-N,N-dimethylaminoethyl)-2-methyl-Δ-2-tetrahydropyrimidine. They may be prepared according to the instructions given in German Auslegeschrift No. 3,049,131.

The following are examples of amidines corresponding to formula (V):

1-methyl-4-(2-tetrahydroazepinyl)-piperazine

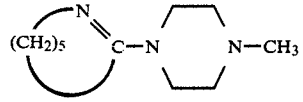

phenyl-methyl-(2-tetrahydroazepinyl)-amine

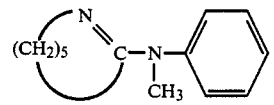

benzyl-methyl-(2-tetrahydroazepinyl)-amine

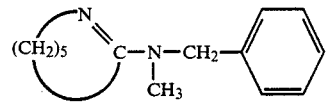

4-(2-tetrahydroazepinyl)-morpholine

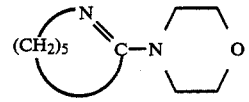

The acyclic amidines or cyclic or bicyclic amidines obtained by the linking together of two groups, are described in German Auslegeschrift No. 2,722,514.

General information of the synthesis of amidines may be found in Houben-Weyl, Methoden der Organischen Chemie, Volume XI, 2, pages 38 to 66, Publishers G. Thien, Stuttgart 1958.

The following is an example of compounds of the type corresponding to formula (VI):

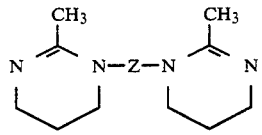

wherein Z preferably has one of the following meanings:
—$(CH_2)_2$—
—$(CH_2)_6$—

—(CH₂)₃—N—(CH₂)₃—
—(CH₂)₆—NH—CO—O—(CH₂)₃—O—(CH₂)₃—O—CO—NH(CH₂)₆— or —(CH₂)₂—O—(CH₂)₂—.

These compounds are obtained by the methods described in German Auslegeschrift No. 3,049,131.

The guanidines, preferably corresponding to formula (VIII), include acyclic or cyclic guanidines or di- or tri-guanidines or compounds which may contain the guanidine group several times:

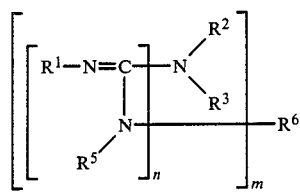  (VIII)

In formula (VIII), the various symbols have the following meanings:

m = 1 or 2,
n = 1, 2 or 3 (when m=1) and 1 (when m=2);
$R^1$, $R^2$, $R^3$ represent the groups already described for the amidine of formula (III);
$R^5$ has the same meaning as $R^2$, and
$R^6$ is either a monovalent group of the type mentioned for $R_2$ or a divalent alkylene group optionally interrupted by —O—, —N(alkyl)— or —N(cyclakyl) groups.

When n=1, two of the groups $R^1$, $R^2$, $R^3$, $R^5$ and $R^6$ may be joined together to form a ring so that cyclic guanidines having the following structure may also be formed:

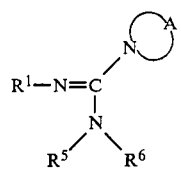  (VIII-a)

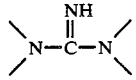  (VIII-b)

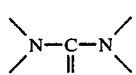  (VIII-c)

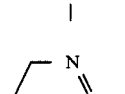  (VIII-d)

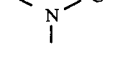  (VIII-e)

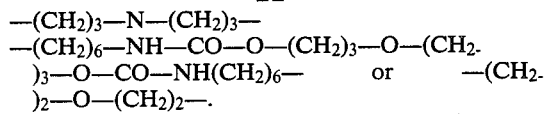  (VIII-f)

In formulae (VIII-a to VIII-f), the groups A and B result from the linkage of two substituents represent bivalent, aliphatic, cycloaliphatic, araliphatic or aromatic carbon chains having at least two, preferably 2 to 5 chain members and optionally interrupted by hetero atoms (—O—, —S—, —N(alkyl)—), or substituted with isocyanate inert substituents (e.g. halogen, alkyl).

Other suitable guanidines are given in the following summary.

| Substituents on the nitrogen | Substituted x-times | in the following primary guanidine structures |
|---|---|---|
| methyl-, ethyl-, (iso)propyl-, (iso)butyl-, (tert.)-butyl-, (iso)pentyl-, hexyl-, 2-ethylhexyl-, octyl-, dodecyl-, stearyl-, ethoxypropyl-, butoxyhexyl-, cyanoethyl-, cyanohexyl-, butoxycarbonyl-methyl-, methoxycarbonylmethyl-, dimethylaminopropyl-, cyclopentyl-, cyclohexyl-, (chloro)benzyl-, phenethyl-, phenyl-, tolyl-, methoxyphenyl-, ethoxycarbonylphenyl-, | tetra- | >N—C(=NH)—N< |
| | penta- | >N—C(—N<)=N— |
| | tri- | (cyclic imidazoline-type structure) |
| | tri- | (cyclic tetrahydropyrimidine-type structure) |

| Substituents on the nitrogen | Substituted x-times | in the following primary guanidine structures |
|---|---|---|
| | tri- | 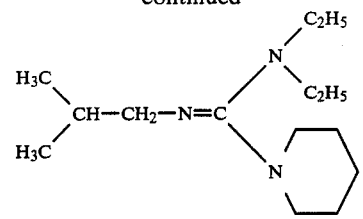 |
| | mono- | 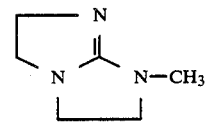 |
| | mono- | 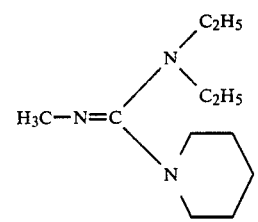 |
| | mono- | 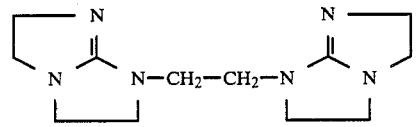 |

Further examples include iminocarbonic acid-bis-(sec.) amides of the following composition:

| Methylimino-, ethylimino-, cyanoethylimino-, dibutylaminobutylimino- hexylimino- stearylimino- cyclohexylimino- benzylimino- phenylimino- p-chlorobenzylimino- 4-methyl-benzylimino- | carbonic acid | -bis-morpholide -bis-piperidide -bis-N'—methyl- piperazide |

Particularly suitable cyclic guanidine compounds are represented by the following formulae:

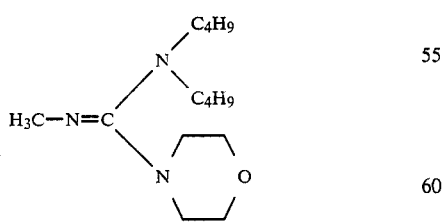

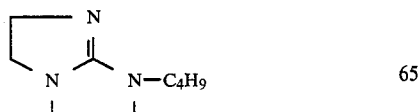

-continued

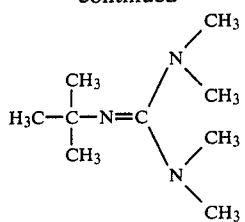

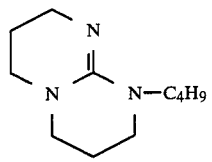

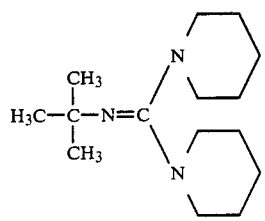

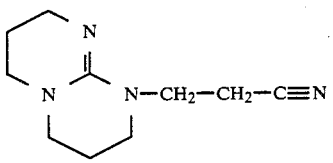

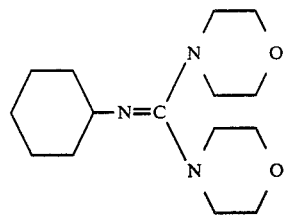

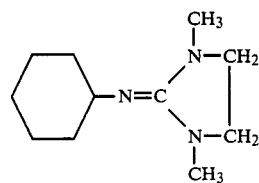

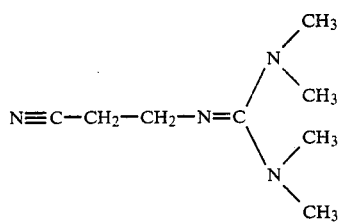

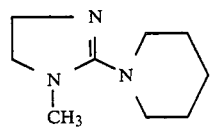

Tetramethylguanidine, pentamethylguanidine and the following cyclic guanidine compounds are particularly preferred:

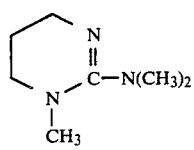 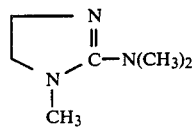

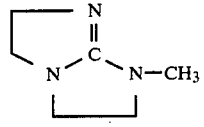 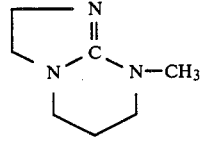

Acid addition salts of the amidines or guanidines may be used instead of the free compounds, although these salts are less preferred. The term "acid addition salts" includes both salts which are formed with acid and salts which are formed with other proton donor compounds. The following are typical acids for the preparation of these salts: monocarboxylic acids such as formic acid, acetic acid, propionic acid, butyric acid, caproic acid, valeric acid, octanoic acid, lauric acid, stearic acid and oleic acid; dicarboxylic acids such as oxalic acid, malonic acid, succinic acid, fumaric acid and adipic acid; hydroxylic acids such as glycolic acid, lactic acid, tartaric acid and the like; sulphonic acids such as alkyl or aryl sulphonic acids, sulphamic acid and sulphanilic acid; inorganic acids such as carbonic acid, phosphoric acid, hydrochloric acid, sulphuric acid and the like. Other proton donor compounds include sulphonamides; phenols such as phenol, cresol or thiophenols; enols such as barbituric acid, uric acid and the like. Fatty acids having at least two carbon atoms and phenols are particularly preferred.

The "amidine stabilizers" may also be used in a mixture with "amine stabilizers" for the polyisocyanates including the above-mentioned hydrazine, alkyl hydrazine or hydrazide compounds.

The "stabilizers" are used in a quantity of from 0.1 to 25 equivalent percent of reactive group (i.e. amine or amidine group) per NCO equivalent in the polyisocyanate, preferably from 0.1 to 8 equivalent percent, and most preferably from 0.3 to 3 equivalent percent. The polyadduct covering may also be produced having even higher proportions, for example 30 equivalent percent of amine or amidine group per NCO, but the proportions of the reactive isocyanate groups are excessively reduced. An NH$_2$ group is an equivalent with hydrazine (or an —NH-alkyl group with alkyl hydrazine derivatives), and an —CO.NH.NH$_2$ group is an equivalent with "hydrazide" compounds.

Temperatures below the respective melting temperatures of the polyisocyanate are selected as temperature for the reaction. They generally lie below 70° C., preferably from 0° to 50° C.

Stabilization of the isocyanate which is solid at room temperature generally takes place within a few minutes so that a continuous mode of operation is preferred during the stabilization reaction.

"Stabilization" of the solid polyisocyanates using stabilizers by polyadduct covering is carried out in a *liquid medium* which is not a (good) solvent for the solid polyisocyanates. The liquid medium may consist of relatively high molecular weight polyols and/or in particular relatively high molecular weight aromatic polyamine compounds having molecular weights of from 400 to 6000, preferably from 400 to 3000, more preferably from 1000 to 3000, optionally with addition of lower molecular weight polyols and/or lower molecular weight aromatic polyamines having molecular weights of from 60 to 399.

Suitable lower molecular weight polyols include, for example, butane-diol-1,4, decane-diol-1,10, neopentylglycol, tetra(hydroxypropyl)-ethylene diamine or castor oil.

Plasticizer-like compounds may also be used during stabilization of the isocyanates, for example phthalates, such as dioctyl, diisododecyl, dibenzyl, butyl benzylphthalate, or phosphates having up to 8 carbon atoms in the alkyl radical such as trioctyl phosphate. Hydrocarbons such as so-called butadiene oils or polyethers having a relatively high molecular weight may be used.

Solvents of a non-polar or slightly polar type may be added to the above-mentioned liquid suspension media (polyols, polyamines, optionally plasticizers). Suitable solvents include for example aliphatic, cycloaliphatic or aromatic hydrocarbons, halogen hydrocarbons, ethers, ketones or esters, preferably having boiling points below 146° C. Reaction may optionally be achieved in a lower viscosity medium. The solvents are preferably removed for example by vacuum extraction following the reaction.

Compounds having a strong "acylating" effect such as isocyanates, acid anhydrides or pyrocarboxylic acid esters are preferably used for the deactivation reaction. Although other compounds having an acylating effect such as acid halides or carbamic acid halides, would also be suitable, they are less preferred in practice as the hydrogen halide formed at the same time has an undesirable effect (for example, it has a catalytic effect on NCO reactions or impairs tertiary amine catalyst).

In particular, isocyanates are suitable deactivators. Examples include mono-isocyanates, such as n-hexylisocyanate, stearylisocyanate, toluene-sulphonyl isocyanate. Diisocyanates and/or polyisocyanates, such as biuret polyisocyanates, trimerized isocyanates, carbodiimidized diisocyanates and similarly higher functional conversion products of diisocyanates and higher functional isocyanates as well as NCO prepolymers are preferred. Examples include hexamethylene diisocyanate; dodecamethylene diisocyanate; isophorone diisocyanate; $\alpha,\alpha,\alpha',\alpha'$-tetramethyl-1-4-hexahydro-p-xylylenediisocyanate; 4,4'- and/or 2,4'-diisocyanatodicyclohexylmethane diisocyanate; biuret polyisocyanates; trimerized and/or carbodiimidized polyisocyanates produced from the diisocyanates; NCO-prepolymers derived from the diisocyanates and/or polyisocyanates from difunctional or higher functional compounds having NCO-reactive groups (such as polyols) and excess molar quantities of diisocyanates and/or polyisocyanates.

Diisocyanates and polyisocyanates which have NCO-groups bound to aliphatic radicals are particularly preferred. However, aromatic monoisocyanates and, in particular, diisocyanates and/or polyisocyanates, for example phenylisocyanate, toluylene diisocyanates, diphenylmethane diisocyanates, 3,3'-dimethyl-4,4'-diisocyanato diphenyl, and in particular trimerizates thereof as well as NCO-prepolymers may also be used.

The deactivation reaction consists of a chemical "trapping" of the free "stabilizers". However, the object of the present invention may also be achieved by physical trapping; for example, by adsorption.

For the deactivation, the acylating compounds are used in sufficient quantities partially or completely to react with the stabilizers (for example aliphatic diamines and/or polyamines) which remain in the suspension and have not reacted on the surface of the finely-divided particles of polyisocyanates.

In fact, it has been found that a considerable proportion of stabilizers remains "free" in the suspension (in other words not reacted with the solid finely-divided polyisocyanates). The amount of free stabilizer was often found to be from about 10 to 85% of the quantity of stabilizer used. The stabilizer is obviously unable to continue reacting through the polyadduct covering already formed. When using aliphatic amines as stabilizers, the retained quantities of amine may sometimes be titrated or determined by gas chromatography.

The (dissolved) components (amine stabilizer, as well as deactivator) may easily be reacted, for example to ureas, semicarbazides or amides, in the "deactivation reaction" with substances having an acylating effect.

The advantageous effect of the "deactivation stage" according to the present invention obviously lies in the ineffectiveness of the remaining stabilizers, for example the aliphatic diamines or polyamines, hydrazines, guanidines or amidines. This may obviously also be effected using acid anhydrides such as acetanhydride or phthalic acid anhydride or pyrocarboxylic acid esters.

Destabilization can also be achieved by neutralization, for example with inorganic or organic acids or with acidic solids, such as acidic aluminum oxide or acidic silicon dioxide, or also by adsorption, for example by using zeolites, activated carbon or similar solid adsorbents capable of binding the excess stabilizers.

Deactivation may also be carried out using substances having an alkylating effect, for example dialkylsulphates or p-toluene sulphonic acid alkyl esters, sulphones, such as propio- or butyro-sulphone (although this is less preferred).

After substantial or complete removal of remaining stabilizers in the suspension, the suspensions no longer have the disadvantages described for the production of bulky shaped articles. Thus, the thickening temperature of the system from solidification of the edges to solidification of the liquid core remains substantially constant, even after slow heating, and no inhomogeneities may be observed over the cross-section due to the rising thickening temperature.

In general, the thickening temperature of the system is somewhat lower in many cases, even in the deactivated state. An explanation might reside in the fact that a subsequent reaction with deeper layers of the polyisocyanate granules still containing NCO-groups occurs in the suspensions containing unreacted stabilizers during warming or thorough heating (for example, heating causes easier diffusion). This on the one hand, reinforces deactivation but, on the other hand, leads to the above-mentioned disadvantages of a continuously rising thickening temperature in the liquid core of bulky shaped articles.

For destabilization using acylating compounds, it is preferable to use sufficient quantities for the stabilizers remaining in the suspension to be at least partially, but preferably completely, acylated (for example converted into ureas with isocyanates).

Up to approximately equivalent quantities of acylating or neutralizing compounds are generally used. However, an excess of isocyanates may be used as "deactivators" with respect to the amine stabilizers used, but this excess should be limited to approximately double the equivalent quantity of amine stabilizers for practical reasons, since reaction between the NCO-reactive components of the system and the free unstabilized polyisocyanates present could occur. This may be observed, for example, by an increase in viscosity of the suspension (presumably due to a reaction with the higher molecular weight polyol). Even a small rise in the thickening temperature above the minimum generally observed with equivalent conversion of deactivation agent and stabilizer is, surprisingly, often observed. Partial to complete neutralization of the remaining stabilizers in the polyurethane suspension is generally desired.

The quantity of adsorbing agents varies depending on type of adsorbent, but may easily be determined by simple preliminary tests (while observing the thickening temperature of the system).

The suspensions thus deactivated according to the present invention may be stored at room temperature for at least a few months after the deactivation step which generally takes place at room temperature, and generally below the melting temperature of the finely-divided polyisocyanates.

In a preferred embodiment, the suspension is deactivated with an approximately equivalent quantity of deactivating isocyanate, with respect to the quantity of stabilizer originally added. The resultant product may generally be stored for months at room temperature, but solidification of the mass takes place from the exterior inwards with very slow heating. The thickening temperature obviously drops somewhat during the slow heating in the still liquid interior of the shaped article in the deactivated state of the suspension so the solidification front proceeds more and more quickly towards the interior of the shaped article during heating. An additional advantage of the process according to the present invention is that suspensions, even if markedly stabilized, i.e. reacted with large quantities of stabilizers, may be deactivated until they are caused to react at normal heating temperatures or thickening temperatures. A highly stabilized one-component casting mixture may be necessary if a casting composition is to be subjected during its production to very strong mechanical stresses, sometimes even with temperature rises, for example in a mixer or crushing unit. For this purpose, a polyurea layer which is as thick as possible or a large amount of stabilizer must be present on the surface of the isocyanate in order to protect it.

Divalent or polyvalent polyhydroxyl compounds containing from 2 to 8, preferably from 2 to 4, hydroxyl groups and having molecular weights of from 400 to 6000 are suitable as higher molecular weight hydroxyl compounds which may be used both as suspension medium for polyisocyanates and as further reactive components for the production of a polyurethane. They include polyesters, polyethers, polythioethers, polyacetals, polycarbonates, polylactones, polyesteramides and polybutadiene compounds containing at least two hydroxyl groups and mixtures thereof of the type known for the production of homogeneous or cellular (or foamed) polyurethanes. Polyethers and polyesters are particularly preferred.

Suitable polyethers are known and are produced, for example, by polymerization of tetrahydrofuran or of epoxides, such as ethylene oxide, propylene oxide, butylene oxide, styrene oxide or epichlorohydrin or by addition of these epoxide compounds (preferably ethylene oxide or propylene oxide), optionally in a mixture or successively, to starting components containing reactive hydrogen atoms, such as water, polyhydric alcohols, ammonia, polyamines or sugar.

Useful polyesters containing hydroxyl groups include, for example, reaction products of polyhydric (preferably dihydric, and/or trihydric) alcohols with polybasic (preferably dibasic) polycarboxylic acids or anhydrides thereof or corresponding polycarboxylic acid esters of lower alcohols. The polycarboxylic acids may be aliphatic, cycloaliphatic, aromatic, araliphatic and/or heterocyclic and may be substituted, for example, by halogen atoms. They may also be unsaturated. Polyesters of lactones (for example, $\xi$-caprolactone) or of hydroxycarboxylic acids (for example, $\omega$-hydroxycaproic acid) may also be used, particularly if they contain additional components such as diethylene glycol or 1,4-butane diol.

Suitable polyacetals include, for example, the compounds which may be produced from glycols and formaldehyde. Polycarbonates containing hydroxyl groups include those of known type which may be produced by reaction of propane diol-1,3, butane diol-1,4 and/or hexane diol-1,6, di-, tri- or tetraethylene glycol or thiodiglycol, with diaryl carbonates (for example, diphenyl carbonate) or with phosgene.

Polyhydroxy compounds in which high molecular weight polyadducts or polycondensates or polymers are contained in finely-dispersed or dissolved form may also be used. Polyhydroxyl compounds modified by vinyl polymers, of the type obtained, for example, by polymerization of styrene and acrylonitrile in the presence of polyethers or polycarbonate polyols are suitable for the process according to the present invention.

Other representatives of such compounds to be used are known and are described, for example, in High Polymers, Vol. XVI "Polyurethanes, Chemistry and Technology", compiled by Saunders-Frisch, Interscience Publishers, New York, London, Vol. I, 1962, pages 32 to 42 and pages 44 to 54 and Vol. II, 1964, pages 5 to 6 and 198 to 199, and in Kunststoff-Handbuch, Vol. VII, Vieweg-Hochtlen, Carl-Hanser-Verlag, Munich, 1966, for example on pages 45 to 71, and in German Auslegeschrift No. 2,854,384.

It is obviously possible to use mixtures of the above-mentioned polyhydroxyl compounds.

Liquid or low-melting (<50° C.) higher molecular weight aromatic polyamines can also be used as the liquid medium.

In particular, polyamino compounds of the type which may be produced by hydrolysis of corresponding NCO-prepolymers on the basis of higher molecular weight polyhydroxyl compounds and excess aromatic diisocyanates by (preferably basic) hydrolysis are used as higher molecular weight polyamino compounds having aromatic amino groups having a molecular weight of from 400 to 6000. Examples of this process are described in German Offenlegungsschriften Nos. 2,948,419, 3,039,600 and 3,112,118 and European Patent Nos. 61,627, 71,132 and 71,139. Other prior art processes for the production of suitable aromatic amino compounds are also described in the first mentioned Offenlegungsschrift. The process according to German Offenlegungsschrift No. 2,948,419 and the other cited patents relates to polyether (which is preferably used), polyester, polyacetal, polythioether or polycaprolactone polyamines, which are preferably difunctional or trifunctional polyamines and contain urethane groups (from the reaction of the corresponding higher molecular polyhydroxyl compounds with the excess polyisocyanates) and bear the amino groups on the radical to which was attached the isocyanate groups. The aromatic polyamines may, however. also be produced by other known processes (see, for example, European Pat. No. 7,132).

As mentioned above, the one-component reactive systems according to the present invention which are stable in storage for prolonged periods are preferably produced using lower molecular weight chain-extenders or cross-linking agents (component (C)). These lower molecular weight chain-extenders or cross-linking agents (component (C)) are difunctional or polyfunctional compounds which have hydroxyl groups (polyols) bound to aliphatic and/or cycloaliphatic groups and/or $NH_2$ groups (polyamines) bound to aromatic, including heterocyclic rings of aromatic character, and having molecular weights from 62 to 399. Lower molecular weight diols having hydroxyl groups bound to aliphatic or cycloaliphatic groups and aromatic diamines in the abovementioned molecular weight range of up to 399 are preferred. Mixtures of various compounds of this type may obviously also be used. Examples of these compounds include: ethylene glycol; trimethylene glycol; butane diol-2,3 and/or -1,4; hexane diol-1,6; neopentylglycol; 1,4-bis-hydroxyethyl cyclohexane; 1,4-dihydroxycyclohexane; terephthalic acid-bis-(-hydroxyethyl)ester; 1,4,3,6-dianhydrohexitols; 1,4-monoanhydrotetritols; as well as less preferred diols having secondary hydroxyl groups, such as, for example, propylene glycol; butane diol-3,3; or pentane diol-2,5. Suitable polyhydric compounds include: trimethylol propane; trimethylol ethane; hexane triol-1,2,6; glycerin; pentaerythritol; quinitol; mannitol; sorbitol; castor oil; as well as di-, tri- and tetraethylene-, -propylene-, and -butylene-glycols; bis-(2-hydroxyethyl)-hydroquinone; bis-(2-hydroxyethyl)-resorcinol; formose or formitol. Diols or polyols containing tertiary amines such as N-methyl diethanolamine, triethanolamine or N,N'-bis-hydroxyethyl piperazine, are also suitable.

Lower molecular weight aromatic diamines are preferably used instead of lower molecular weight polyols. The term "aromatic polyamines" should include amines which contain the amino groups bound on heterocyclic radicals of aromatic character. Suitable aromatic polyamines include, for example, p-phenylene diamine; 2,4-/2,6-toluylene diamines; diphenylmethane-4,4'- and/or -2,4'- and/or -2,2'-diamines; 3,3'-dichloro-4,4'-diaminodiphenylmethane; 3-($C_1$–$C_8$)-alkyl-4,4'-diaminodiphenylmethanes; 3,3'-di-($C_1$–$C_4$)-alkyl-4,4'-diaminodiphenylmethanes; 3,3', 5,5'-tetra-($C_1$–$C_4$)-alkyl-4,4'-diphenylmethanes; 4,4'-diaminodiphenyl sulphides, -sulphoxides or -sulphones; 2,4-diaminobenzoic acid esters as described in German Auslegeschrift No. 2,025,900; and, toluylene diamines substituted by 1 or 2 $C_1$–$C_4$-alkyl groups. 3,5-diethyl-2,4- and/or -2,6-diaminotoluene (in particular commercial (80/20) or (65/35) isomer mixtures), unsymmetrically tetraakyl-substituted diaminodiphenylmethanes (for example, 3,5'-diethyl-3', 5'-diisopropyl-4,4'-diaminodiphenylmethane) and isomer mixtures thereof (as described in German Auslegeschrift No. 2,902,090), 4,4'-diaminobenzanilide, 3,5-diaminobenzoic acid-$C_1$–$C_4$-alkyl ester, 4,4'- and/or 2,4'-diaminodiphenylmethane, and naphthylene-1,5-diamine are particularly preferred.

Additional useful materials include adipic acid bis-(2-hydroxyethyl)-esters; terephthalic acid-bis-(2-hydroxyethyl)-esters; diol-urethanes; diol-ureas; polyols containing sulphonate and/or phosphonate groups; 1,6-hexamethylene-bis-(2-hydroxyethylurethane); 4,4'-diphenylmethane-bis-(2-hydroxyethyl-ureas); or the adduct of Na-bisulphite to butee diol-1,4; and the alkoxylation products thereof. Further lower molecular weight compounds (C) are described in detail in German Auslegeschrift No. 2,854,384.

Compounds which are monofunctional towards isocyanates may also optionally be used in the conventional manner in proportions of from 0.1 to 10% by weight as so-called "chain terminators".

The conventional polyurethane catalysts may be used as catalysts (D) for the one-component systems but organic lead and/or tin compounds are particularly effective, optionally while using further conventional polyurethane catalysts, and in particular tertiary amine-containing catalysts. These are described in detail in European Pat. No. 1,103,323. The lead catalysts are particularly active and effective if polyether polyols having secondary hydroxyl groups (for example polypropylene oxide glycols) are used.

When using uretdione diisocyanates, additional cross-linking may take place, in particular with lead catalysts, due to the cleavage of the uretdione ring, and branching allophanate groups. With complete cleavage of the uretdione ring, additional urethane groups are formed.

When using polyols having substantially primary hydroxyl groups, on the other hand, the tin compounds (particularly the tin/sulphur-catalysts) are particularly effective. Catalysis may usually be omitted completely with polyethers containing aromatic $NH_2$ groups. The catalyst are generally used in a quantity of from 0.001 to 5%, by weight, preferably from 0.01 to 2%, by weight, based on the weight of (A)+(B).

Auxiliaries and additives (E) which may optionally be used include: dyes or pigments; fillers such as silica gel, gypsum, talcum, activated carbon, powdered metal; UV-absorption agents or stabilizers, such as phenolic antioxidants; light-protection agents; blowing agents; surface-active additives, such as emulsifiers or foam stabilizers; cell regulators; antiblocking agents; silicones; fire-protection agents; or substances having a fungistatic and/or bacteriostatic effect.

Suitable fillers include, for example, inorganic and/or organic fibrous reinforcing materials, for example glass fibers (preferably in lengths of from 20 to 60 mm), graphite fibers, asbestos fibers or organic fiber materials such as polyethylene terephthalate, or preferably aromatic polyamides, such as m-phenylene/isophthalic acid polyamide or poly-p-phenylene-terephthalamide or also polycaprolactam. These fibrous materials may also be in the form of a mat, strip, continuous fibers, web, fabric or a random mixture of staple fibers. Glass fibers provided with size to give the fibers an affinity for polyurethanes are preferred. The quantity of fillers to be incorporated depends on the desired improvement in the mechanical properties, and from 5 to 60%, by weight, of fibrous material is generally used.

The NCO/($NH_2$+OH) ratio [NCO from reactive stabilized polyisocyanate and any free polyisocyanate to amino and/or OH-groups from relatively high molecular weight polyols and/or polyamines (B) and/or chain-extenders (C)] is from 0.5:1 to 1.5:1, preferably from 0.8:1 to 1.5:1, more preferably from 0.95:1 to 1.2:1.

From 0.3 to 10, preferably from 0.5 to 8, and more preferably from 0.75 to 5 equivalents of $(OH+NH_2)$ equivalents of chain-extenders (C), i.e. lower molecular weight polyols or lower molecular weight polyamines are used in the polyurethane reactive mixtures per $(OH+NH_2)$ equivalent of higher molecular weight polyols and/or polyamines (B).

Diisocyanates containing uretdione rings may generally be considered as diisocyanates, so only the free NCO-groups are considered. Under certain test conditions (use of lead catalysts, or a higher processing temperature, for example higher than 140° C.), the uretdione ring takes part in the reaction (additional bonding points via allophanate or biuret groups), so the latent NCO-groups of the uretdione ring have to be taken into consideration during calculation. Depending on the viscosity and melting behavior of the starting components, readily pourable, spreadable or even solid, easily melting one-component reactive mixtures are obtained at room temperature. These reactive mixtures represent a heterogeneous suspension of the solid stabilized isocyanates in the polyol and/or polyamine components. The thermal cross-linking of this mixture usually takes place only after addition of suitable catalyst (D). Without these catalysts, it is not generally possible to obtain polyurethane molding compositions having satisfactory properties. However, merely by using the aromatic polyamine compounds which are considerably more reactive towards NCO-groups, the addition of catalyst becomes unnecessary.

A further feature of the one-component reactive systems is that they cross-link within a few minutes after attaining a particular temperature (depending on quantity and type of the stabilizer). This means, on the one hand, that a desirably long flow path for the not yet cross-linked reactive mixture allows the hot mold to be filled completely below this temperature ("thickening temperature"). On the other hand, the subsequent rapid solidification of the casting compositions after a rise in temperature allows rapid mold release cycles. Another advantage of the present invention is the very long storage time of the starting reactive systems even at relatively high storage temperatures (for example, up to 60° C.). The advantage over the prior art where a reaction delay in one-component systems is achieved only by "heterogeneity" of one or more components is that protection is also considerably improved by a polyadduct covering, and the protection may be removed only by the thermal impact (or very strong shearing or dissolving by means of highly polar solvents). The use of the polyisocyanate suspensions according to the present invention enables the uses of one-component systems to be diversified considerably. It is possible to use not only solidifying, but also liquid higher molecular weight polyamine and polyol systems. It is not necessary only to use selected chain-extenders (for example, high-melting chain-extenders). A significant feature of the one-component systems of the present invention is that aromatic diamines (such as 4,4'-diaminodiphenylmethane, 2,4- or 2,6-diaminotoluene, 3,5-diethyl-2,4/2,6-(65/35)-diaminotoluene, 1,5-diaminonaphthalene or 3,4-diethyl-3', 5'-diisopropyl-4,4'-diaminodiphenyl methane) may also be used in these systems as chain-extenders without impairing the character of the one-component system. On the other hand, if these above-mentioned amines are reacted with NCO-prepolymers by one of the former methods, the resultant extremely short casting times do not permit these compositions to flow properly in the mold.

By using higher molecular weight polyamines in the one-component system, it is possible to achieve greater strengths, greater tension values, greater hardness and greater softening ranges, than with higher molecular weight polyols.

The one-component systems according to the present invention (optionally containing catalysts) can be solidified substantially by thermal impact. At room temperature or at a slightly higher temperature, a cross-linking reaction surprisingly does not take place even in the presence of highly effective catalysts, so that catalyst-containing mixtures may be regarded as one-component systems which are stable in storage for prolonged periods.

The one-component systems according to the present invention are processed depending on the composition. Liquid systems, which may be poured at room temperature, may be applied by a pouring process, but they are optionally heated briefly, for example to from 50° to 70° C., prior to processing. Processing may also be effected by centrifugal casting. Hollow bodies may be produced by introducing the reactive composition into heated molds and distributing it over the surface by suitable rotational movements Heated molds may also be filled with the reactive composition by the slush molding process and, after a certain heating period on the heated mold surface, any excess, not yet reacted reaction composition is poured from the molds again. Cellular polyurethanes which may have an integral skin structure may be produced by using blowing agents.

Systems which cannot be poured but which still flow may be applied, for example, using a doctor blade, to desired substrates, such as textile substrates (for example non-woven, knitted and woven fabrics), (split) leather, matrices (for example velour or leather-silicone-matrices) or intermediate carriers (for example papers) to form coatings or finishings and may then be solidified by application of heat.

Plastic systems or pastes may be heated while pressing and shaping, from 5 to 15 minutes being sufficient for solidification at 120° C.

Surface coatings, molds or molded articles may also be produced by dipping processes by immersing the heated shapes to be coated into the reaction composition.

The reactive composition may also be extruded through slits or nozzles into hot media (hot air or hot liquids) and thus solidified. The reactive composition may be partially or substantially reacted to polyurethane in heated extruders and extruded in this form through slits or nozzles and optionally fully reacted in hot media, or may be introduced into a hot mold, from which it may be released after a short period. The reactive composition may also be processed by the reaction injection molding (RIM) process.

Solid systems, in particular those using higher melting starting polyols (from 45° to 65° C.) are processed either with pressure and shaping (injection molding) or at or above the melting temperature of the polyol. The previously produced one-component systems may also be introduced in the form of solid granules into a mold warmed above the melting point of the polyol (generally below 70° C.). After the granules have melted and the tool has been filled, the mold is heated to from 100° to 120° C. and the contents solidified.

The solidification temperature of the one-component systems according to the present invention is greatly dependent on the quantity and chemical composition of the stabilizing compounds. As the solidification temperature rises, the solidification period for forming the polyurethanes decreases. The period for thorough heating may be from less than one minute to several hours depending on the temperature. It is sometimes advantageous to temper the plastics for a further period after removal from the mold in order to ensure complete and thorough hardening.

Curing of the one-component reactive systems may also be effected by adding (preferably) highly polar solvents such as dimethylformamide, or N-methyl-pyrrolidone, or moderately polar solvents such as propylene carbonate, dioxane, or glycol-monomethyl acetate. The pouring time (pot life) of such compositions may be controlled by the quantity of these additions of solvent. With small quantities, systems having pot-lives of several days at room temperature are obtained while, with greater addition, rapid or even jerky solidification takes place after from 10 to 15 minutes. The quantity of solvents added again depends on the quantity and type of stabilizer (quality of the polyadduct skin on the surface of the isocyanates) and is determined for the respective systems by preliminary small scale experiments. The commercial advantage of these reaction mixtures resides in the fact that these systems solidify without the supply of heat. The thermal solidification time of the one-component systems may obviously also be reduced by suitable metering of the solvents, and adequate stability in storage may thus be achieved.

Solidification of the one-component systems herein may also be achieved by applying high shearing forces, for example in high-speed stirrers. The heat of reaction produced by brief stirring does not generally reach the cross-linking-thickening temperature of the one-component systems, so the polyurea skin located on the surface of the polyisocyanate particles must be destroyed merely by mechanical stress during the stirring process.

Further processes for stabilization and various conditions and processes for the production of the one-component reactive systems and the curing thereof may be found in the Examples.

The invention is further illustrated, but is not intended to be limited by the following examples in which all parts and percentages are by weight unless otherwise specified.

EXAMPLES

EXAMPLE 1

Prevention of a rise in the thickening temperature of one-component reactive compositions stabilized to varying degrees Formulation:

1.1 Production of stabilized polyisocyanates according to the prior art 100 parts of an aromatic amino polyether [based on a polyoxypropylene ether-diol (molecular weight 2000) and toluylene-diisocyanate-2,4 (molar ratio 1:2)], prepared by the process according to German Offenlegungsschrift No. 2,948,419, having an amine value of 48.0 and a molecular weight of 2334, x parts of 4,4'-diamino-3,3'-dimethyl-dicyclohexylmethane (as stabilizer), and 16.6 parts of fine-particled dimeric 2,4-diisocyanato-toluene (TT) are used.

The quantities of 4,4'-diamino-3,3'-dimethyl-dicyclohexylmethane (DADMD) indicated in Table 1 are dissolved in the amino-polyether and the finely-divided dimeric 2,4-diisocyanato-toluene (TT) is suspended in this mixture. After degassing for 1 hour at 50° C., the suspension of the stabilized finely-divided diisocyanate in the amino-polyether is stored at room temperature and at 50° C. It was found that fractions of the DADMD were still present in the polyurethane reactive mixture in a free, i.e. unreacted form. From about 1/6 to 1/7 of the quantity of diamine used had reacted after about 4 weeks storage at room temperature and about 50% after storage at 50° C. (24 hours).

1.2 Process according to the present invention

The specified quantities of 2,4-toluylene-diisocyanate (TDI) were introduced into the suspensions of Example 1.1 after a storage time of 4 weeks in fractions of the suspensions in a deactivator/stabilizer molar ratio of about 1:1. The thickening temperatures determined after one day's storage at room temperature are compiled in Table 1.

1.3 Results according to the prior art

If the one-component reactive compositions listed in Table 1 are solidified without stabilization in 5 liter molds (sheet metal buckets) at a heating temperature of 120° C., solidification takes a very long time. The undesirable side-effects thus produced, for example due to the continuous rise in the thickening point of the liquid fraction inside the molding composition are more pronounced, the higher the amount of stabilization at the outset.

1.4 Results with products of the process according to the present invention

After deactivation with the quantities of TDI indicated in Table 1, the compositions had lower thickening temperatures. The stability in storage was maintained at room temperature. With slow thorough heating, slightly further deactivation of the system occurred. After thermal solidification at 120° C., however, large-volume molded articles which are free from defects (cylindrical 5 kg-blocks) are obtained.

By pouring the one-component mixtures into flat, open molds treated with release agents (Trennmittel-V Bayer AG, D-5090 Leverkusen)) and thermal solidification by 8 hours tempering at 120° C., high quality elastomer test plates are obtained, having the following mechanical properties within the specified limits:

|  | According to DIN |  |
|---|---|---|
| Shore hardness A | 53 505 | 93 to 94 |
| Tensile strength (MPa) | 53 504 | 14 to 17 |
| Breaking elongation (%) | 53 504 | 420 to 470 |
| Tear propagation resistance (kN/m) | 53 505 | 25 to 27 |
| Elasticity (%) | 53 512 | 49 to 51 |

The (minimum) thickening temperature may be determined by giving the reactive component mixture onto a Koflerbench and determining the (lowest) temperature, where the hardening to an elastomeric compound will occur.

TABLE 1

| Composition | Comparison (without deactivation according to present invention) | | | Deactivation according to present invention with an acylating agent | |
|---|---|---|---|---|---|
| | Diamine used for stabilization (DADMD) (x, in parts by weight) | Storage temperature of the EK-RM (4 weeks storage) | ADT in (°C.) | Molar ratio/deactivator/ stabilizer = 1:1, deactivation with TDI (in parts, by weight) | (after deactivation and 1 day's storage at room temperature) (°C.) |
| 1a | 0.2 | Room temp. | 80 | 0.146 | 54 |
| 1b | 0.2 | 50° C. | 95 | 0.146 | 70 |
| 2a | 0.3 | Room temp. | 90 | 0.219 | 54 |
| 2b | 0.3 | 50° C. | 110 | 0.219 | 78 |
| 3a | 0.4 | Room temp. | 100 | 0.292 | 83 |
| 3b | 0.4 | 50° C. | 115 | 0.292 | 88 |
| | (These one-component casting compositions produce inhomogeneous reactions, and surface defects in large volume shaped articles.) | | | (These one-component casting compositions produce homogeneous large-volume shaped articles.) | |

DADMD = 3,3'-dimethyl-4,4'-diamino-dicylcohexylmethane
EK-RM = one-component reactive casting composition (according to formulation)
ADT = thickening temperature (temperature of the spontaneous beginning of solidification)
RT = room temperature

EXAMPLE 2

Deactivation of the suspension using various diisocyanates.

A one-component reactive composition prepared according to Example 1 and stabilized with 0.3 parts of diamine (DADMD) is deactivated with various diisocyanates.

Formulation:
100 parts of aromatic amino polyether according to Example 1.
0.3 parts of 4,4'-diamino-3,3'-dimethyldicyclohexylmethane (DADMD)
16.6 parts of dimeric 2,4-diisocyanatotoluene (TT).

All mixtures are stable in storage at room temperature. Mixtures 1 to 3 harden quickly and uniformly after gradual heating to 120° C. in 5 liter molds. Mixture 4 remains liquid for a very long time and has a thickening temperature which has risen to 115° C. after 3 hours storage at 120° C. in the core of the mold.

parts of finely-divided dimeric 2,4-diisocyanatotoluene (TT) are suspended therein. Finally, 0.2 parts of Pb-II-octoate and 0.4 parts of Sn-II-octoate are dissolved therein. A one-component mixture (which may be stored up to 50° C. for as long as desired and has a viscosity of 1400 mPa.s at 22° C.) is obtained. After thermal solidification in a 1 cm thick layer and subsequent tempering for 8 hours at 120° C., an elastomer having the following mechanical properties was produced:

| | |
|---|---|
| Shore hardness A | 92 |
| Tensile strength (MPa) | 11 |
| Breaking elongation (%) | 180 |
| Tear propagation resistance (kN/m) | 17 |
| Elasticity (%) | 48 |

During an attempt to produce a cylindrical 500 g shaped article by thoroughly heating the casting composition in a mold (can), the thickening temperature

TABLE 2

| Deactivation with (parts) | Molar ratio deactivator/ stabilizer | Thickening temperature (1 week after deactivation and storage at room temperature) | Viscosity of the one-component casting composition (Pa·s) after | |
|---|---|---|---|---|
| | | | production | 1 week at R.T. |
| 0.11 TDI | 0.5 | 75 | 24 (liq) | 24 (liq) |
| 0.29 TDI | 1.0 | 69 | 25 (liq) | 25 (liq) |
| 0.35 TDI | 1.6 | 64 | 100 (thixotropic) | 80 (thixotropic) |
| 0.14 IPDI | 0.5 | 73 | 24 (liq) | 24 (liq) |
| 0.28 IPDI | 1.0 | 64 | 33 (liq) | 28 (liq) |
| 0.35 IPDI | 1.2 | 72 | 38 (thixotropic) | 42 (thixotropic) |
| 0.16 HMDI | 0.5 | 84 | 25 (liq) | 25 (liq) |
| 0.33 HMDI | 1.0 | 82 | 30 (liq) | 88 (liq) |
| 0.563 HMDI | 1.7 | 86 | 46 (thixotropic) | 32 (thixotropic) |
| without (comparison) | 0 | 90 | 24 | 24 |

HMDI = 4,4'-diisocyanato-dicyclohexylmethane

EXAMPLE 3

Deactivation of a one-component casting composition based on polyether-diol/chain-extenders.

100 parts, by weight, of a polyoxypropylene etherdiol (having a molecular weight of 2000), 8.9 parts of 2, 4-/2,6-(65/35)-diamino-3,5-diethyltoluene and 0.5 parts of 2,5-diamino-2,5-dimethyl-hexane (stabilizer for the dimeric toluylene-diisocyanate) are mixed and 38.3 rises to 118° C. Final solidification into the interior of the core lasts for a long time and the defects, i.e. inhomogeneities, described above appear.

However, if the suspension is deactivated before thermal solidification, as indicated in Table 3, by addition of isocyanates, thermal solidification takes place continuously, defects do not appear in the elastomer, and the thickening temperature remains substantially constant.

TABLE 3

| Test No. | Deactivation using various isocyanates | Molar ratio deactivator/ stabilizer | (minimal) thickening temperature after 1 day's storage at room temperature | Solidification of a 500 g molded article |
| --- | --- | --- | --- | --- |
| 1 | (without deactivation - as comparison) | | rising from 68°C. | very slow to solidification in the core; thickening temperature rising 118° C. (about 8 hours thorough heating time) |
| 2 | 0.60 parts TDI | 1.0 | 40° C. | very rapid (15'/120° C.) |
| 3 | 0.77 parts IPDI | 1.0 | 62° C. | rapid (25'/120° C.) |
| 4 | 0.91 parts 4,4'-diisocyanato-dicyclohexyl-methane | 1.0 | 68° C. | rapid (30'/120° C.) |

EXAMPLE 4

Deactivation of a one-component PU-casting mixture which has been excessively retarded by stabilization
(a) Comparison (highly amine-stabilized)

2.0 parts of 4,4'-diamino-3,3'-dimethyl-dicyclohexylamine (as amine stabilizer) are dissolved in 100 parts of an aromatic amino polyether according to Example 1 and 18 parts of 3,3'-diisocyanato-4,4'-dimethyl-N,N'-diphenylurea in finely-divided form are stirred in. The suspension is passed through a corundum disc mill with 0.25 mm grinding gap to crush the unground urea diisocyanate. Due to the strong amine stabilization (coating of the solid isocyanate), no polyaddition reaction took place in the one-component mixture even under the strong grinding conditions (heating to about 100° C. by heat of friction). However, the thickening temperature of the mixture is too high at 168° C. Solidification of the one-component mixture to form a low quality elastomer took place after prolonged heating at 180° C.
(b) Deactivation (according to the present invention)

By addition of 1.86 parts of isophorone diisocyanate to 120 parts of the one-component casting mixture (with ground isocyanate), a one-component casting composition having a lower thickening temperature of 85° C. is obtained which may be solidified at 20° C. or 150° C. to form high quality elastomers having the following mechanical properties:

| | |
| --- | --- |
| Shore hardness A | 93 |
| Tensile strength (MPa) | 12.3 |
| Breaking elongation (%) | 200 |
| Tear propagation resistance (kN/m) | 23 |
| Elasticity (%) | 49 |

EXAMPLE 5

Deactivation of a stabilized one-component polyurethane casting mixture.
(a) Comparison (highly amine-stabilized)

As in Example 4, a one-component casting mixture having a thickening temperature of 180° C. is produced from 100 parts of the aromatic amino polyether from Example 1, 2.0 parts of 4,4'-diamino-3,3'-dimethyl-dicyclohexylmethane and 18.0 parts of unground, dimeric 2,4-diisocyanato-toluene (TT) by grinding in the corundum disc mill described above. An elastomer having completely unsatisfactory properties is obtained only by heating to from 190° to 200° C.
(b) Deactivation according to the present invention After deactivation with 3.74 parts of IPDI per 120 parts of the above one-component mixture, a casting mixture having a thickening temperature of 94° C. is obtained. After solidification and 8 hours tempering at 120° C. a high quality elastomer having the following properties was formed:

| | |
| --- | --- |
| Shore hardness A | 93 |
| Tensile strength (MPa) | 16 |
| Breaking elongation (%) | 450 |
| Tear propagation resistance (kN/m) | 26 |
| Elasticity (%) | 50 |

EXAMPLE 6

Deactivation with zeolite powders
Formulation:
1000 parts of aromatic aminopolyether (according to Example 1),
0.2 parts of 4,4'-diamino-3,3'-dimethyl-dicyclohexylamine and
6.6 parts of dimeric 2,4-diisocyanato-toluene (TT).

TABLE 4

| Test No. | zeolite addition | Thickening temperature (°C.) |
| --- | --- | --- |
| 4.1 | 6.8 parts of Na—zeolite (pore size 4Å) | 58–60 |
| 4.2 | 6.8 parts Na—zeolite X (pore size 9Å) | 62–65 |
| 4.3 | without (comparison) | 80 |

With regard to the zeolites, see literature: M. Mengel, Chemie-Technik, 10 (1981), p. 1135–1140.

The one-component casting composition produced according to Example 1 is deactivated by addition of various zeolite powders and degassed again under vacuum. Casting compositions which are stable in storage at room temperature and begin to solidify from about 50° C. with slow heating are obtained. Large-volume shaped articles may be produced without difficulty by thermal solidification at 120° C.

EXAMPLE 7

Deactivation with finely-dispersed silica (Aerosil)
One-component casting compositions produced according to Example 1, which are stabilized with various quantities of amine, are deactivated by addition of finely-divided silica (Aerosil 380, manufactured by Degussa). After incorporation of silica, the compositions are degassed again and small elastomer samples are produced to assess the flow and the elastomer properties (Shore A hardness).
Formulation:

100 parts of aromatic amino polyether according to Example 1.1;
x parts of methyl-nonane diamine (Phillips Petroleum), and
16.6 parts of dimeric 2,4-diisocyanatotoluene (TT).

TABLE 5

| Test No. | x parts amine stabilizer | Parts Aerosil (deactivator) | Thickening temperature (°C.) | Thixotropy | Flow of the suspension | Hardness** Shore A (in elastomer) |
|---|---|---|---|---|---|---|
| 1 | 0.3 | 0 | 120 | none | good | 93.5 |
| 2 | 0.3 | 1.0 | 90 | weak | good | 93.5 |
| 3 | 0.3 | 2.75 | 64 | distinct | weak | 94 |
| 4 | 0.3 | 5 | 48 | strong | none | 94.5 |
| 5 | 0.2 | 0 | 110 | none | good | 93.5 |
| 6 | 0.2 | 1.0 | 56 | weak | good | 93.5 |
| 7 | 0.2 | 2.75 | 40 | distinct | weak | 94 |
| 8 | 0.2 | 5 | room temperature | strong | none | 94.5 |
| 9 | 0.1 | 0 | 72 | none | good | 93.5 |
| 10 | 0.1 | 1.0 | room temperature | weak | good | 93.5 |

**After curing for 4 hours at 125° C.

EXAMPLE 8

Deactivation of an amidine-stabilized, one-component polyurethane mixture 0.22 parts of 1,2-dimethyl-tetrahydropyrimidine are dissolved in 100 parts of the aminopolyether containing aromatic amino end groups (which is described in Example 1) and 16.7 parts of dimeric 2,4-diisocyanatotoluene (TT) are stirred in. The storage-stable casting composition has a thickening temperature of 80° C. which increases to 100° C. on heating up slowly.

After deactivating the casting composition with 1.39 parts of 2,4-diisocyanatotoluene (this corresponds to a molar ratio of 4:1 of 2,4-diisocyanatotoluene to the 1,2-dimethyltetrahydropyrimidine used) the thickening temperature of the casting composition drops to 65° C. On heating up slowly the casting composition already becomes solid at about 50° C. and a homogeneous elastomer is obtained which has a uniform distribution of properties throughout its entire cross-section.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of deactivated suspensions of solid polyisocyanates of retarded reactivity comprising:
   (A) reacting
   (i) one or more solid, finely divided polyisocyanates having melting points above 30° C. with
   (ii) from 0.1 to 25 equivalent percent of reactive groups per isocyanate equivalent of a stabilizer compound having a molecular weight of from 32 to 6000 selected from the group consisting of aliphatic polyamines, hydrazines, alkylhydrazines, N,N'-dialkylhydrazines, polyhydrazides, amidine-group containing compounds, guanidine-group containing compounds, and mixtures thereof, in the presence of
   (iii) an organic material having a molecular weight of from 400 to 6000 selected from the group consisting of
   (1) compounds containing two or more hydroxyl groups,
   (2) compounds containing two or more aromatically-bound amino groups, and
   (3) mixtures thereof, to thereby form a suspension of stabilized polyisocyanate in said organic material, and
   (B) adding to the suspension of step (A) at a temperature below the melting temperature of the polyisocyanate a deactivator which at least partially deactivates any unreacted quantities of said stabilizer compound.

2. The process of claim 1 wherein said deactivator is selected from the group consisting of (i) compounds having an acylating effect on said stabilizer compound. (ii) compounds having a neutralizing effect on said stabilizer compound, (iii) compounds having an alkylating effect on said stabilizer compound, and (iv) solid adsorbents which adsorb said stabilizer compound.

3. The process of claim 1 wherein step (A) is additionally conducted in the presence of lower molecular weight polyols and/or aromatic polyamines having molecular weights of from 60 to 399, and optionally in the presence of non-polar or slightly polar solvents.

4. The process of claim 1, characterized in that isocyanates, acid anhydrides or pyrocarboxylic acid esters are used as deactivators.

5. The process according to claim 4, characterized in that said deactivator is a mono-, di- and/or poly-isocyanate.

6. The process according to claim 4, characterized in that said deactivator is selected from the group: diisocyanate and/or polyisocyanate, NCO-prepolymers derived therefrom on the basis of difunctional and polyfunctional isocyanate-reactive compounds and excess molar quantities of diisocyanates and/or polyisocyanates, biuret-polyisocyanates produced from the diisocyanates, trimerized polyisocyanates and/or carbodiimidized polyisocyanates.

7. The process of claim 1, characterized in that inorganic or organic acids or acidic solids are used as deactivators.

8. The process of claim 1, characterized in that solid adsorbents are used as deactivators.

9. The process according to claims 1 to 6, characterized in that the amounts of reactants in step (A) correspond to a formulation of a one-component polyurethane-reactive system.

10. A deactivated suspension of polyadduct-covered stabilized solid polyisocyanates prepared by the process of claim 1.

11. A deactivated suspension of polyadduct-covered polyisocyanates prepared by the process of claim 6.

12. In the process of producing isocyanate addition products by the reaction of
(A) polyisocyanates,
(B) relatively high molecular weight polyhydroxyl and/or polyamino compounds,
(C) optionally, low molecular weight chain-extenders,
(D) optionally, catalysts and
(E) optionally, conventional auxiliaries and additives, the improvement wherein components (A) and (B) are supplied in the form of a suspension produced in accordance with claim 1.

* * * * *